United States Patent
Sogabe

(10) Patent No.: US 9,925,836 B2
(45) Date of Patent: Mar. 27, 2018

(54) FACILITY-USE MANAGEMENT SYSTEM, IN-VEHICLE CONTROL APPARATUS, AND IN-FACILITY APPARATUS

(71) Applicant: DENSO CORPORATION, Kariya, Aichi-pref. (JP)

(72) Inventor: Haruhiko Sogabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/917,202

(22) PCT Filed: Aug. 21, 2014

(86) PCT No.: PCT/JP2014/004294
§ 371 (c)(1),
(2) Date: Mar. 7, 2016

(87) PCT Pub. No.: WO2015/037194
PCT Pub. Date: Mar. 19, 2015

(65) Prior Publication Data
US 2016/0207363 A1    Jul. 21, 2016

(30) Foreign Application Priority Data

Sep. 10, 2013   (JP) ................................ 2013-187552

(51) Int. Cl.
*G01M 17/00* (2006.01)
*G06F 7/00* (2006.01)
(Continued)

(52) U.S. Cl.
CPC ........ *B60C 23/0471* (2013.01); *B60C 23/044* (2013.01); *B60C 23/0442* (2013.01); *B60C 23/0472* (2013.01); *B60C 23/0479* (2013.01)

(58) Field of Classification Search
CPC .............. B60C 23/0471; B60C 23/044; B60C 23/0442; B60C 23/0472; B60C 23/0479
See application file for complete search history.

(56) References Cited

U.S. PATENT DOCUMENTS 5,838,229 A * 11/1998 Robinson ............ B60C 23/0401
340/442
6,948,070 B1 * 9/2005 Ginter ..................... G06F 21/10
348/E5.006
(Continued)

FOREIGN PATENT DOCUMENTS

JP          2005083025 A    3/2005
JP          2008077462 A    4/2008
(Continued)

OTHER PUBLICATIONS

JP,2005-083025,A English Translation from https://www4.j-platpat.inpit.go.jp/cgi-bin/tran_web_cgi_ejje?u=http://www4.j-platpat.in-pit.go.jp/eng/translation/201702240011221018535742464580787C2BA4BFA3CD0A514C64A9FEBBB2653FC.*
(Continued)

*Primary Examiner* — Jean Paul Cass
(74) *Attorney, Agent, or Firm* — Harness, Dickey & Pierce, P.L.C.

(57) ABSTRACT

An ECU is used to a tire pressure monitoring system of a vehicle. The ECU includes a contact storage portion and a post-replacement ID reporting section. The contact storage portion stores previously a contact of a management computer of a facility that the vehicle uses. The post-replacement ID reporting section transmits a post-replacement tire ID of a tire, which is substituted in the tire replacement, to the contact in the contact storage portion via a communication network when the tire replacement is detected by a tire replacement detection section. The management computer includes a registration change section that registers the post-replacement tire ID in a registration portion upon receiving the post-replacement tire ID.

6 Claims, 7 Drawing Sheets

(51) Int. Cl.
　　　*G06F 11/30*　　　(2006.01)
　　　*G06F 19/00*　　　(2011.01)
　　　*G07C 5/00*　　　(2006.01)
　　　*B60C 23/04*　　　(2006.01)

(56) References Cited

U.S. PATENT DOCUMENTS

| | | | | |
|---|---|---|---|---|
| 7,015,801 | B1* | 3/2006 | Juzswik | B60C 23/0408 340/10.1 |
| 8,751,092 | B2* | 6/2014 | Deniau | B60C 23/0418 340/442 |
| 8,994,533 | B2* | 3/2015 | Billmaier | G06Q 10/087 340/10.2 |
| 9,024,743 | B2* | 5/2015 | Deniau | B60C 23/044 340/442 |
| 9,317,983 | B2* | 4/2016 | Ricci | H04W 4/046 |
| 9,348,492 | B1* | 5/2016 | Penilla | B60W 40/08 |
| 9,367,973 | B2* | 6/2016 | McGinnis | G05B 19/418 |
| 9,373,149 | B2* | 6/2016 | Abhyanker | G06Q 50/28 |
| 9,446,636 | B2* | 9/2016 | Deniau | B60C 23/0479 |
| 9,517,664 | B2* | 12/2016 | McIntyre | B60C 23/02 |
| 9,524,597 | B2* | 12/2016 | Ricci | G07C 9/00126 |
| 9,646,439 | B2* | 5/2017 | Ricci | G07C 9/00158 |
| 9,778,831 | B2* | 10/2017 | Penilla | G06F 3/04842 |
| 2001/0018727 | A1* | 8/2001 | Ando | G11B 23/1883 711/112 |
| 2002/0130771 | A1* | 9/2002 | Osborne | B60C 23/005 340/438 |
| 2003/0145650 | A1* | 8/2003 | Juzswik | B60C 23/0416 73/146 |
| 2004/0149025 | A1* | 8/2004 | Toyofuku | B60C 23/0416 73/146 |
| 2004/0217854 | A1* | 11/2004 | Hirohama | B60C 23/0416 340/445 |
| 2005/0192858 | A1* | 9/2005 | Mueller | G06Q 10/20 705/7.31 |
| 2005/0266387 | A1* | 12/2005 | Rossides | G09B 7/00 434/323 |
| 2014/0306799 | A1* | 10/2014 | Ricci | B60Q 1/00 340/5.83 |
| 2014/0306814 | A1* | 10/2014 | Ricci | H04W 48/04 340/425.5 |
| 2014/0306815 | A1* | 10/2014 | Henriet | B60C 23/0455 340/447 |
| 2014/0306834 | A1* | 10/2014 | Ricci | B60Q 1/00 340/902 |
| 2014/0309806 | A1* | 10/2014 | Ricci | B60Q 1/00 701/1 |
| 2015/0061895 | A1* | 3/2015 | Ricci | H04W 4/22 340/902 |
| 2015/0232065 | A1* | 8/2015 | Ricci | B60R 25/01 701/36 |
| 2016/0086391 | A1* | 3/2016 | Ricci | G07C 5/008 701/29.3 |
| 2016/0207363 | A1* | 7/2016 | Sogabe | B60C 23/044 |
| 2016/0249853 | A1* | 9/2016 | Ricci | A61B 5/4809 340/870.07 |
| 2016/0258830 | A1* | 9/2016 | Lammers | B60C 23/008 |

FOREIGN PATENT DOCUMENTS

| | | |
|---|---|---|
| JP | 2009054108 A | 3/2009 |
| JP | 2009238089 A | 10/2009 |
| JP | 2009270357 A | 11/2009 |
| JP | 2012171470 A | 9/2012 |

OTHER PUBLICATIONS

U.S. Appl. No. 14/917,196, dated Mar. 7, 2016, Sogabe.
International Search Report and Written Opinion (in Japanese with English Translation) for PCT/JP2014/004294, dated Nov. 25, 2014; ISA/JP.

\* cited by examiner

| | FACILITY | CONTACT | HIGH FREQUENT USE | USED TIRE POSITION ||||
|---|---|---|---|---|---|---|---|
| | | | | RIGHT-FRONT | RIGHT-REAR | LEFT-FRONT | LEFT-REAR |
| 1 | A | VVVV | | ○ | ○ | ○ | ○ |
| 2 | B | WWWW | ○ | ○ | × | ○ | × |
| 3 | C | XXXX | | ○ | × | × | × |
| 4 | D | YYYY | ○ | × | ○ | × | × |
| 5 | E | ZZZZ | | × | × | ○ | × |

FACILITY-USE MANAGEMENT SYSTEM, IN-VEHICLE CONTROL APPARATUS, AND IN-FACILITY APPARATUS

CROSS REFERENCE TO RELATED APPLICATIONS

This application is a U.S. National Phase Application under 35 U.S.C. 371 of International Application No. PCT/JP2014/004294 filed on Aug. 21, 2014 and published in Japanese as WO 2015/037194 A1 on Mar. 19, 2015. This application is based on and claims the benefit of priority from Japanese Patent Application No. 2013-187552 filed on Sep. 10, 2013. The entire disclosures of all of the above applications are incorporated herein by reference.

TECHNICAL FIELD

The present disclosure relates to a facility-use management system that uses a tire pressure monitoring system and permits use of a facility, and an in-vehicle control apparatus and in-facility apparatus included in the facility-use management system.

BACKGROUND ART

A tire pressure monitoring system (TPMS) in a vehicle is known which measures air pressures of tires using sensor units provided in tires and directly sends measurement values to a reception apparatus in the vehicle by wireless communication.

Patent literature 1 discloses an in-facility apparatus that receives an ID sent directly by a sensor unit of the TPMS by wireless communication and permits the use of the facility such as opening a shutter of a parking lot when the received ID is already registered in a use-permission database.

PRIOR ART LITERATURES

Patent Literature

Patent literature 1: JP 2005-083025 A

SUMMARY OF INVENTION

The apparatus disclosed in Patent Literature 1 needs to register IDs (hereinafter, tire IDs) of sensor units provided in tires when such tire IDs are not yet registered in an apparatus in a facility. Such situation may be caused by a sudden tire replacement due to some reason such as a flat tire or fallen snow, for instance.

The methods for registering a tire ID in an in-facility apparatus may include submitting a handwritten application to an administrator; executing an electronic application on a website window displayed in a mobile phone; and manipulating a push button provided in an in-facility apparatus. Those registering methods, however, need times and efforts of users such as correcting errors of wrong tire IDs written or typed, or registering tire IDs each time tires are substituted, thereby making users feel troublesome. Further, such needed times and efforts may involve a congestion in the line of vehicles waiting for the use permission of the facility.

Thus, the tire IDs, which are wirelessly transmitted directly from the sensor units of TPMS, may be preferred to be used for the in-facility apparatus to register automatically. Such registering method, however, may cause the in-facility apparatus to fail to register correct tire IDs. That is, when a plurality of TPMS of vehicles are present within a communication range, the in-facility apparatus may fail to determine one of the vehicles whose tire IDs need to be registered.

An object of the present disclosure is to provide a facility-use management system, an in-vehicle control apparatus, and an in-facility apparatus, which enable accurate registration of correct tire IDs to the in-facility apparatus with times and efforts saved for users while reducing congestion due to the new registration of tire IDs when providing a use permission of a facility using a tire pressure monitoring system.

In addition, according to an example of the present disclosure, a facility-use management system is provided to include an in-vehicle control apparatus in a vehicle and an in-facility apparatus in a facility. The in-vehicle control apparatus, which is used to a tire pressure monitoring system of the vehicle, includes an in-vehicle wireless reception section that receives a first tire ID from a sensor unit provided in at least one tire of the vehicle, the first tire ID identifying the tire. The in-facility apparatus includes (i) an in-facility wireless reception section that receives the first tire ID wirelessly transmitted directly from the sensor unit, (ii) a registration portion in which a second tire ID is registered, the second tire ID corresponding to a permitted vehicle that is provided with a use permission of the facility, and (iii) a use permission determination section that determines a use permission of the facility depending on whether the first tire ID received by the in-facility wireless reception section is included in the second tire ID registered in the registration portion. The in-vehicle apparatus includes (i) a contact storage portion that stores previously a contact of an in-facility apparatus of at least one facility that the vehicle uses, (ii) a tire replacement detection section that detects a tire replacement that is made in the vehicle, and (iii) a post-replacement ID reporting section that transmits a post-replacement tire ID of a tire that is substituted in the tire replacement to the contact stored in the contact storage portion via a communication network when the tire replacement detection section detects the tire replacement made in the vehicle. The in-facility apparatus includes a registration change section that registers the post-replacement tire ID in the registration portion when the post-replacement tire ID is transmitted from the in-vehicle control apparatus via the communication network.

According to the above, when the tire replacement detection section detects a tire replacement, the post-replacement tire ID reporting section transmits a post-replacement tire ID to the in-facility apparatus of the facility used by the vehicle via a communication network. The post-replacement tire ID of the tire substituted in the tire replacement is thus registered automatically to the in-facility apparatus, saving the time and effort for users in the registration of the post-replacement tire ID. This can eliminate an occurrence of the congestion of the vehicles waiting for their turns for use permission of the facility.

Furthermore, the post-replacement tire ID is transmitted to the in-facility apparatus via a communication network from the in-vehicle control apparatus. This can prevent the in-facility apparatus from mistakenly registering a tire ID of a vehicle that has not undergone a tire replacement, as a post-replacement tire ID, allowing the in-facility apparatus to register a correct tire ID certainly.

Thus, when a use permission of a facility is provided using a tire pressure monitoring system, an occurrence of congestion of vehicles due to new registration of a tire ID can be suppressed and the times and efforts for users can be saved, allowing the in-facility apparatus to register correct a tire ID certainly.

In addition, according to other examples of the present disclosure, an in-vehicle control apparatus and an in-facility apparatus are provided as being used in the facility-use management system according to the above example. Thus, when a use permission of a facility is provided using the tire pressure monitoring system, an occurrence of congestion of vehicles due to new registration of a tire ID can be suppressed and the times and efforts for users can be saved, allowing the in-facility apparatus to register correct a tire ID certainly.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

The following will explain embodiments of the present disclosure with reference to drawings.

First Embodiment

Figure 1:
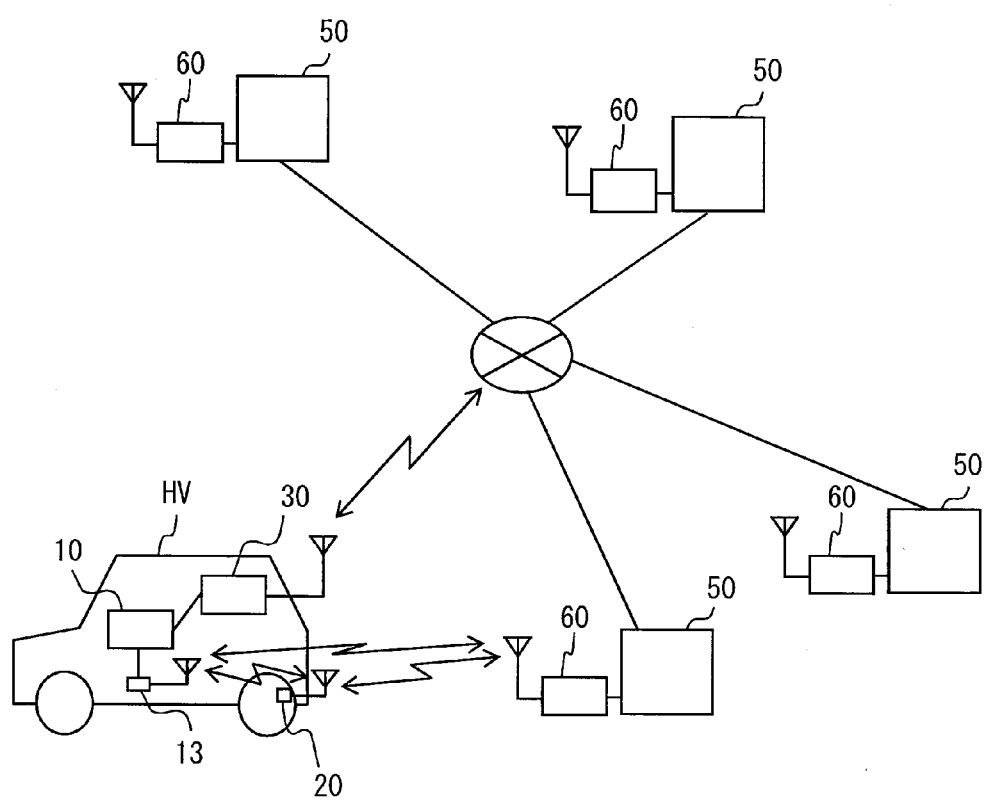
FIG. 1 is a block diagram illustrating an example of a schematic configuration of a facility-use management system according to a first embodiment of the present disclosure.

FIG. 1 is a block diagram illustrating a schematic configuration of a facility-use management system 100 according to a first embodiment of the present disclosure. The facility-use management system 100 in FIG. 1 includes an ECU 10 for TPMS, and a plurality of management computers 50.

The ECU 10 for TPMS is mounted in a vehicle HV. The vehicle HV may be also referred to as a host vehicle HV. The ECU 10 for TPMS is also used in a tire pressure monitoring system 40 (hereinafter, TPMS). The ECU 10 for TPMS may be also referred to as an in-vehicle control apparatus. It is noted that the facility-use management system 100 includes a plurality of ECUs 10 for TPMS that are mounted in a plurality of respective vehicles HV. In addition, the following will explain a single vehicle HV (also referred to as a subject vehicle HV) as an example.

Figure 2:
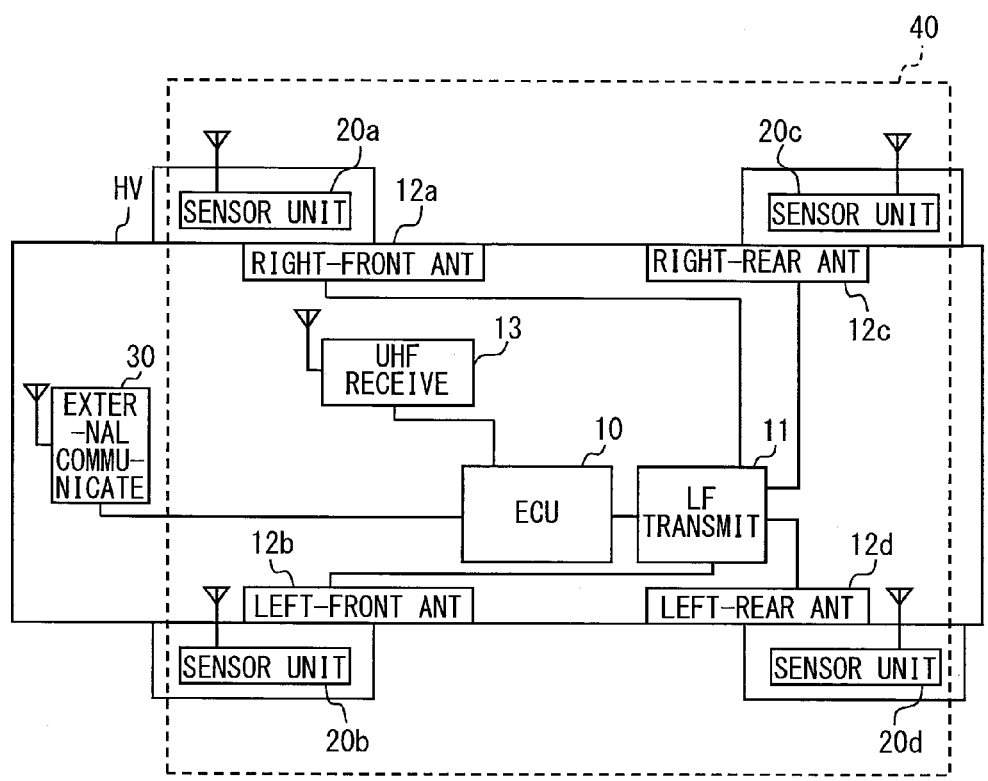
FIG. 2 is a block diagram illustrating an example of a schematic configuration of a TPMS according to the first embodiment of the present disclosure.

The TPMS 40 mounted in the subject vehicle HV will be explained with reference to FIG. 2. As in FIG. 2, the TPMS 40 includes an ECU 10 for TPMS; an LF transmission portion 11; a right-front wheel antenna 12a (hereinafter, right-front wheel ANT); a left-front wheel antenna 12b (hereinafter, left-front wheel ANT); a right-rear wheel antenna 12c (hereinafter, right-rear wheel ANT); a left-rear wheel antenna 12d (hereinafter, left-rear wheel ANT); a UHF reception portion 13 for TPMS; and sensor units 20 (20a-20d).

The ECU 10 for TPMS mainly includes a microcomputer which contains a CPU, ROM, RAM, backup RAM, and I/O (none shown), executing various processes by executing control programs stored in the ROM.

Figure 3:
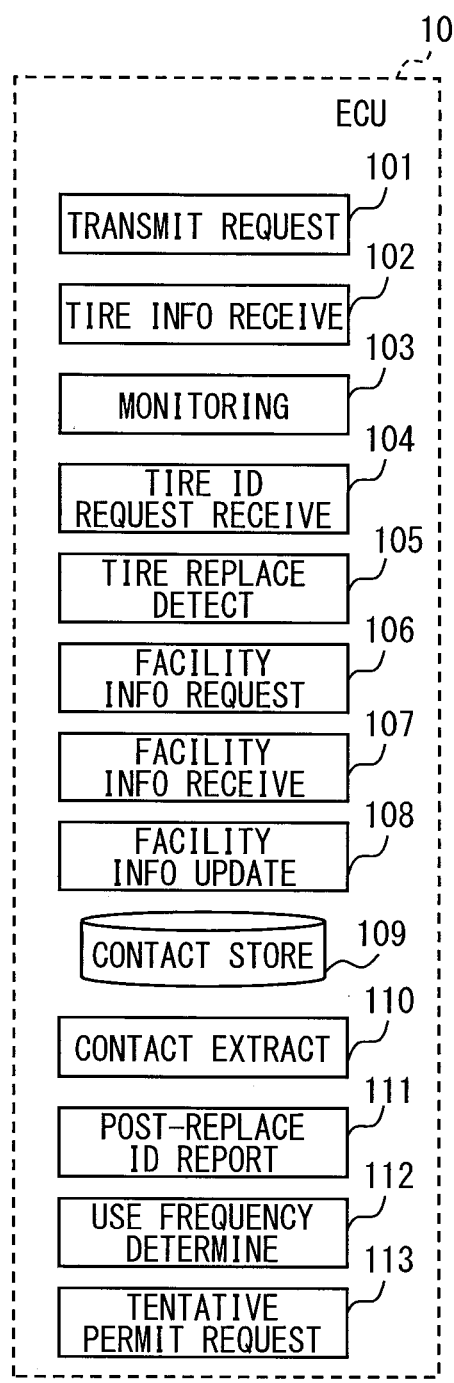
FIG. 3 is a block diagram illustrating an example of a schematic configuration of an ECU for TPMS according to the first embodiment of the present disclosure.

As in FIG. 3, the ECU 10 for TPMS includes functional blocks of a transmission request section 101, a tire information reception section 102, a monitoring processing section 103, a tire ID request reception section 104, a tire replacement detection section 105, a facility information request section 106, a facility information reception section 107, a facility information update section 108, a contact storage portion 109, a contact extraction section 110, a post-replacement ID reporting section 111, a use frequency determination section 112, and a tentative permission request section 113. The transmission request section 101 transmits a transmission request signal to the LF transmission portion 11 via a communication line.

The LF transmission portion 11 includes an LF antenna, via which the information is transmitted on electric waves of LF band (for example, 30 kHz-300 kHz). The LF antenna includes a right-front wheel ANT 12a in a right-front wheel; a left-front wheel ANT 12b in a left-front wheel; a right-rear wheel ANT 12c in a right-rear wheel; and a left-rear wheel ANT 12d in a left-rear wheel, for instance.

The LF transmission portion 11 transmits a series of transmission request signals, which are sent via the communication line from the transmission request section 101 of the ECU 10 for TPMS, to the right-front wheel ANT 12a, left-front wheel ANT 12b, right-rear wheel ANT 12c, and left-rear wheel ANT 12d, in this order with time intervals. The right-front wheel ANT 12a, left-front wheel ANT 12b, right-rear wheel ANT 12c, and left-rear wheel ANT 12d are, in this order, caused to transmit a series of the transmission request signals to the respective sensor units 20a to 20d on electric waves of LF band.

The UHF reception portion 13 for TPMS includes a UHF antenna, which receives the tire information transmitted one by one in series from the sensor units 20a to 20d on electric waves of UHF band (for example, 300 MHz-3 GHz). The UHF reception portion 13 for TPMS outputs the tire information transmitted from the sensor units 20a to 20d to the ECU 10 for TPMS via the communication line.

The sensor units 20a to 20d may be collectively referred to as a sensor 20. The sensor unit 20a is provided in the right-front wheel of the vehicle HV; the sensor unit 20b is in the left-front wheel; the sensor unit 20c is in the right-rear wheel; and the sensor unit 20d is in the left-rear wheel. For example, the sensor units 20a to 20d, which are integrated with the respective tire valves, are attached to the respective disc wheels of tires.

For example, each of the sensor units 20a to 20d includes a pneumatic sensor which detects the tire pressure, a wireless communication portion which transmits and receives the information via wireless communication, and a microcomputer which transmits the tire information using the wireless communication portion. The wireless communication portion receives signals transmitted, for example, on electric waves of LF band, and transmits signals on electric waves of UHF band. In addition, the tire information is defined to include a tire pressure detected with a pneumatic sensor, an ID identifying each tire (henceforth, tire ID), and a tire position. Here, "ID" signifies identification or identification data.

The tire ID may be assigned to each tire, or to each sensor unit 20a to 20d attached to each corresponding tire. The tire position signifies an attachment position of a tire in the vehicle HV, such as right-front wheel, left-front wheel, right-rear wheel, or left-rear wheel.

Each time receiving the respective transmission request signals transmitted one by one on electric waves on LF band via the wireless communication portion from the right-front wheel ANT 12a, left-front wheel ANT 12b, right-rear wheel ANT 12c, and left-rear wheel ANT 12d, the sensor units 20a to 20d detect the tire pressures with the pneumatic sensors and transmit the tire information on electric waves of UHF band.

In the ECU 10 for TPMS, the tire information reception section 102 receives the tire information transmitted one by one from the sensor units 20a to 20d via the UHF reception portion 13 for TPMS. The tire information reception section 102 may be referred to as an in-vehicle wireless reception section. Based on the tire pressures contained in the tire information which the tire information reception section 102 receives, the monitoring processing section 103 performs a monitoring process which monitors the states of the tire pressures of the vehicle HV. The monitoring process, for example, may be provided to display the tire pressures on a display unit (unshown), or to output a notice via a display unit or audio output unit when the tire pressure is not within a normal range.

Of the ECU 10 for TPMS, the followings will be explained later in detail: the tire ID request reception section 104, the tire replacement detection section 105, the facility information request section 106, the facility information reception section 107, the facility information update section 108, the contact storage portion 109, the contact extraction section 110, the post-replacement ID reporting section 111, the use frequency determination section 112, and the tentative permission request section 113.

Returning to FIG. 1, the ECU 10 for TPMS performs the various processes relevant to the use permission of the facility in addition to the performances as part of the TPMS 40. The various processes relevant to the use permission of the facility will be explained in detail later. In addition, the ECU 10 for TPMS communicates with the management computers 50 using an external communication apparatus 30 via a communication network.

The external communication apparatus 30 is used by the ECU 10 for TPMS to communicate with management computers 50 via a communication network (i.e., network) such as the Internet, a cellular network. The external communication apparatus 30 may be a DCM (Data Communication Module) or a portable terminal brought into the vehicle HV, for example. When using the portable terminal as the external communication apparatus 30, the ECU 10 for TPMS and the external communication apparatus 30 may be connected with each other using either a wired line via a connector or a wireless link.

When the information is transmitted from the external communication apparatus 30 to the management computer 50, the information is attached with an ID of either the vehicle HV or the external communication apparatus 30, which can identify the vehicle HV serving as a transmission source.

Then, the management computer 50, which is provided to a facility, provides a use permission of the facility. This facility includes a mechanical parking lot, a garage with a electric shutter, and a tollbooth with a gate. The use permission of the facility provided by the management computer 50 includes an opening of a gate or electric shutter in cases of the mechanical parking lot, garage with a electric shutter, and tollbooth with a gate. Here, the management computer 50 may be referred to as an in-facility apparatus.

Figure 4:
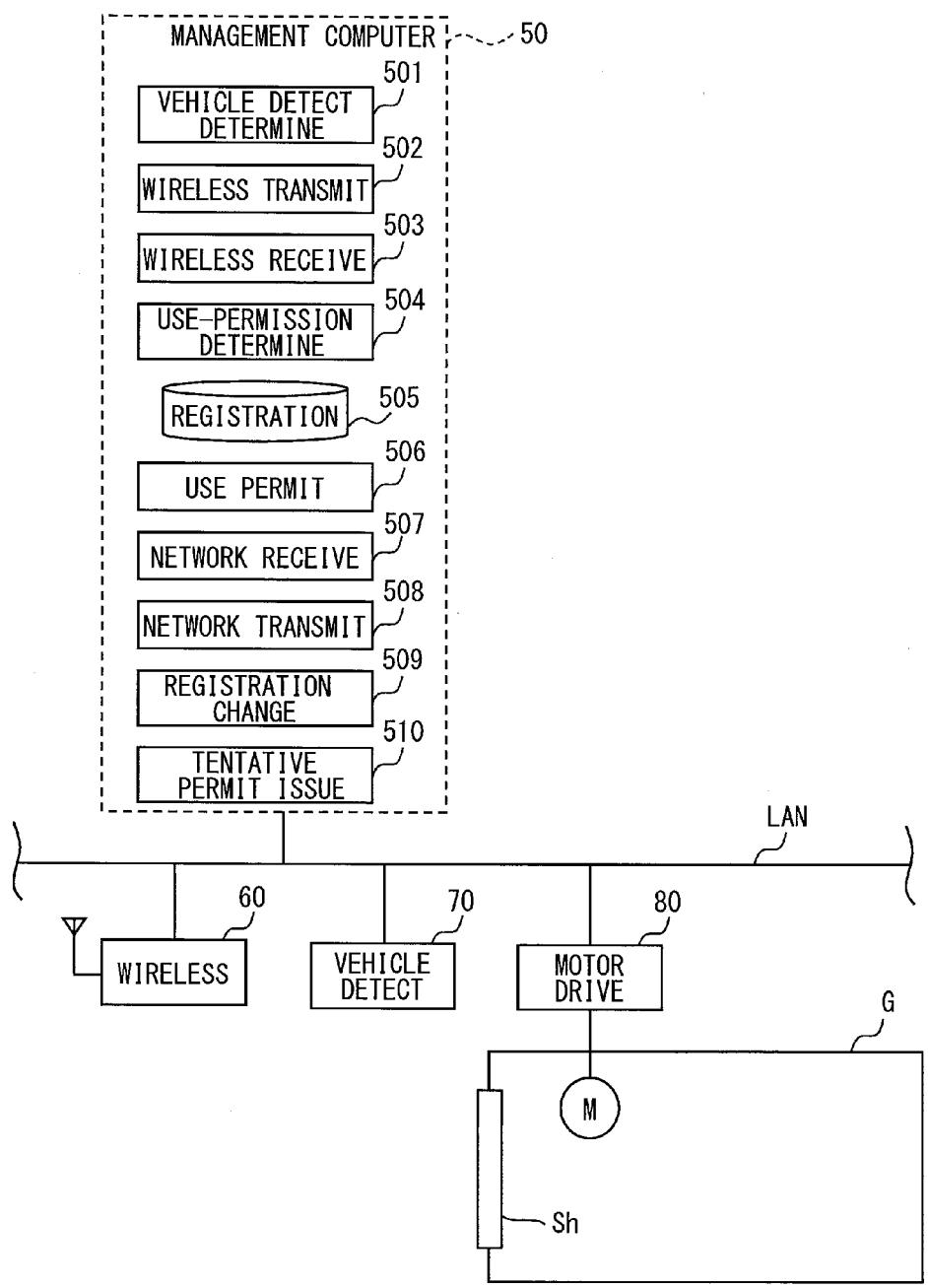
FIG. 4 is a block diagram illustrating an example of a schematic configuration of a management computer according to the first embodiment of the present disclosure.

The management computer 50 will be explained with reference to FIG. 4. In FIG. 4, for instance, the management computer 50 is provided to, as a facility, a garage G with an electric shutter Sh. As in FIG. 4, the management computer 50 is connected with a wireless communication apparatus 60, a vehicle detection sensor 70, and a motor drive control apparatus 80, via, e.g., a LAN to communicate the information.

The wireless communication apparatus 60 transmits wirelessly a tire ID request signal which requests transmission of a tire ID, according to instructions from the management computer 50. In an example of the present embodiment, the tire ID request signal is transmitted on electric waves of UHF band. The ECU 10 for TPMS of the vehicle HV responds to the tire ID request signal; thereby, the wireless communication apparatus 60 receives the tire information transmitted one by one from the sensor units 20a to 20d and sends it to the management computer 50.

The vehicle detection sensor 70 can detect that the vehicle HV is located in front of the garage G provided with the management computer 50. The vehicle detection sensor 70 can use the various sensors such as an infrared sensor, weight sensor, ultrasonic sensor, laser radar, camera.

The motor drive control apparatus 80 performs a drive control of a motor M driving opening and closing of the electric shutter Sh of the garage G. The motor drive control apparatus 80 opens and closes the electric shutter Sh through the drive control of the motor M according to instructions of the management computer 50.

The management computer 50 mainly includes a microcomputer which contains a CPU, ROM, RAM, backup RAM, and I/O (none shown), executing various processes by executing control programs stored in the ROM.

As in FIG. 4, the management computer 50 includes functional blocks respectively corresponding to a vehicle detection determination section 501, a wireless transmission section 502, a wireless reception section 503, a use permission determination section 504, a registration portion 505, a use permission section 506, a communication network reception section 507, a communication network transmission section 508, a registration change section 509, and a tentative-permission issuance section 510.

Figure 5:
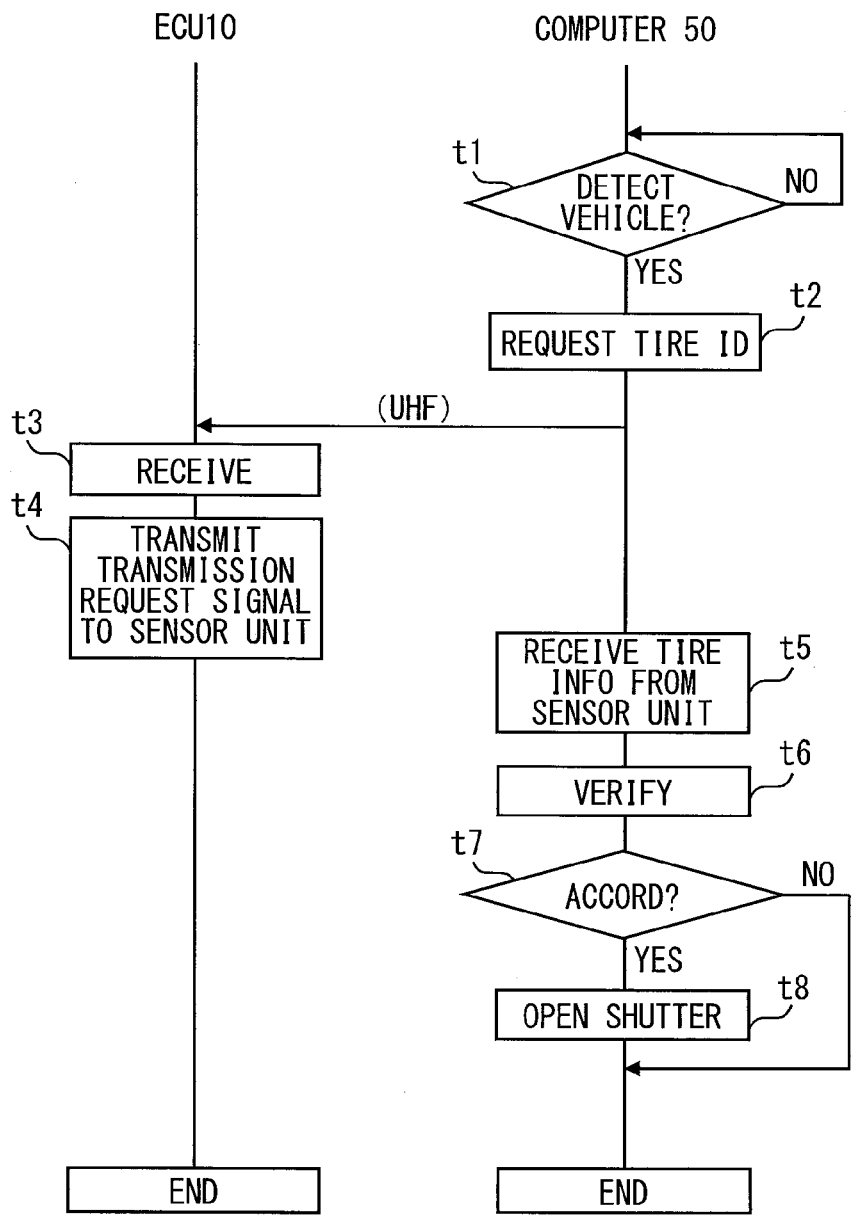
FIG. 5 is a sequence diagram illustrating an example of a flowchart until a use permission of a facility in the facility-use management system according to the first embodiment.

The following will explain an example of a flowchart until a use permission of a facility in the facility-use management system 100 with reference to the sequence diagram in FIG. 5. It is noted that the following explanation is premised on that the vehicle HV and the wireless communication apparatus 60 are located close enough to communicate with each other using electric waves on UHF band.

First, at t1, it is determined whether the vehicle HV is detected by the vehicle detection determination section 501 of the management computer 50. Whether the vehicle HV is detected is determined depending on whether the vehicle HV is detected with the vehicle detection sensor 70. When it is determined that the vehicle HV is detected (t1: YES), the processing moves to t2. In contrast, when it is determined that the vehicle HV is not detected (t1: NO), the determination as to whether the vehicle HV is detected is repeated.

At t2, the wireless transmission section 502 of the management computer 50 transmits a tire ID request signal from the wireless communication apparatus 60. The wireless communication apparatus 60 transmits the tire ID request signal on electric waves of UHF band.

At t3, the tire ID request reception section 104 of the ECU 10 for TPMS receives the tire ID request signal on electric waves of UHF band via the UHF reception portion 13 for TPMS. At t4, the transmission request section 101 of the ECU 10 for TPMS transmits the transmission request signal to the LF transmission portion 11; the right-front wheel ANT 12a, left-front wheel ANT 12b, right-rear wheel ANT 12c, and left-rear wheel ANT 12d transmit the respective transmission request signals to the sensor units 20a to 20d on electric waves of LF band.

At t5, the tire information, which is transmitted from the sensor units 20a to 20 on electric waves of UHF band in responding to the transmission request signals, is received by the wireless reception section 503 of the management computer 50 via the wireless communication apparatus 60. The wireless reception section 503 may be referred to as an in-facility wireless reception section.

At t6, the use permission determination section 504 of the management computer 50 performs a verification process. The verification process verifies the tire ID included in the tire information received by the wireless reception section 503 with the registration ID list registered in the registration portion 505.

The registration ID list is a list where tire IDs of vehicles that are provided with use permission are registered. As an example, the following will be explained on the premise that the registration ID list associates tire IDs with respective tire positions of each vehicle provided with use permission.

It is noted that in the registration ID list, either (i) tire IDs of all tire positions, or (ii) tire ID(s) of part of all the tire positions are registered. When only the tire ID(s) of part of all the tire positions are registered, the determination of a use permission is naturally made for the tire ID(s) of part of all the tire positions. Registration of tire IDs into the registration portion 505 is premised to be made previously, for instance, through a terminal of a dealer at the time of purchasing the vehicle, except for the registration of the post-replacement tire IDs mentioned later.

At t7, it is determined whether or not the tire IDs associated with the vehicle HV in the registration ID list accord with any one of the tire IDs received from the sensor units 20a to 20d of the vehicle HV based on the result of the verification process. When the registered tire IDs accord with any one of the received tire IDs (t7: YES), the processing moves to t8. In contrast, when the registered tire IDs do not accord with any one of the received tire IDs (t7: NO), the process ends.

At t8, the use permission section 506 transmits a shutter open command to the motor drive control apparatus 80 so as to perform a drive control of the motor M to open the electric shutter Sh; the processing then ends. Upon receiving the shutter open command, the motor drive control apparatus 80 performs the drive control of the motor M according to the command and opens the electric shutter Sh of the garage G to enable the garage G to be available.

Figure 6:
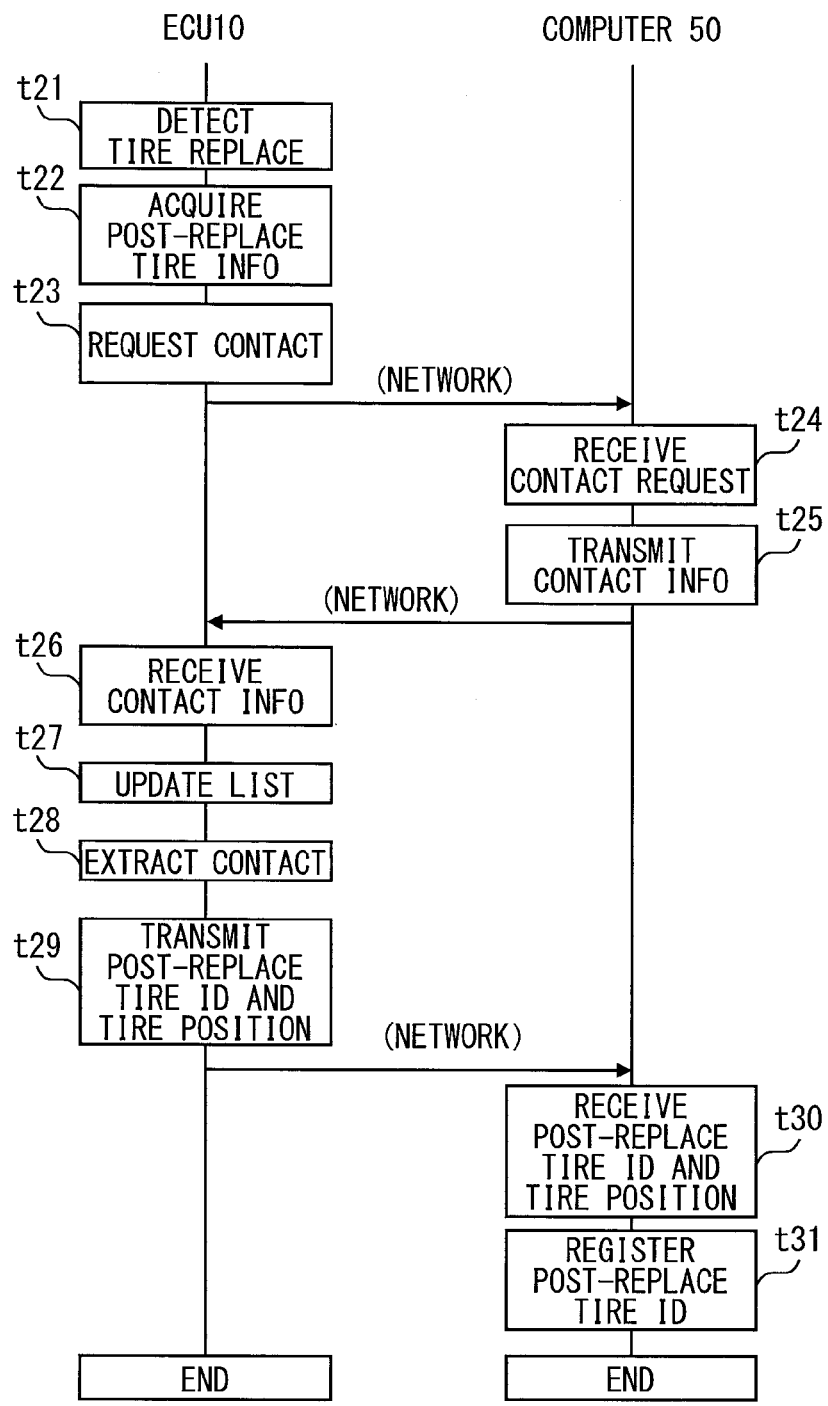
FIG. 6 is a sequence diagram illustrating an example of a flowchart until a registration of post-replacement tire IDs in the facility-use management system according to the first embodiment.

The following will explain an example of a flowchart until a registration of post-replacement tire IDs in the facility-use management system 100 with reference to the sequence diagram in FIG. 6. It is noted that the following explanation is premised on that the vehicle HV and the wireless communication apparatus 60 are located close enough to communicate with each other using electric waves on UHF band.

At t21, a tire replacement of tires of the vehicle HV, which is performed, is detected by the tire replacement detection section 105 of the ECU 10 for TPMS. The detection of the tire replacement by the tire replacement detection section 105 may be made based on the change in the tire IDs received from the sensor unit 20 of each tire. For example, the tire replacement of a subject tire position may be detected when the tire ID of the subject tire position at the present reception is different from that at the previous reception, or when no tire ID of the subject tire position is received at the present reception.

In addition, the detection of the tire replacement may be made based on an input by a user through an unshown manipulation input portion, the input indicating that a tire replacement has been made. In the present embodiment, the following will be explained in an example where the tire replacement is detected based on the change in the tire ID received from the sensor unit 20 of each tire.

At t22, the ECU 10 for TPMS acquires the tire information after the tire replacement (the post-replacement tire information). For instance, the tire information received by the tire information reception section 102 at the time the tire replacement detection section 105 detects the tire replacement may be used as the post-replacement tire IDs. Alternatively, after the detection of the tire replacement by the tire replacement detection section 105, the ECU 10 for TPMS may transmit a transmission request signal from the transmission request section 101, receiving the tire information transmitted from the sensor unit 20 in responding to the transmission request signal. Such received tire information may be used as the post-replacement tire IDs.

At t23, the facility information request section 106 of the ECU 10 for TPMS transmits a contact request that requests contact information to any management computer 50 whose contact is included in the contact facility list stored in the contact storage portion 109, via the external communication apparatus 30.

The contact facility list contains a contact of a management computer 50 of any facility which the vehicle HV uses. The contact facility list may preferably associate each management computer 50 with at least either (i) any tire position used for determining a use permission or (ii) a use degree of a corresponding facility by the vehicle HV. The contact information corresponds to each item of the contact facility list with respect to each facility having a corresponding management computer 50.

Figures 7, 8:
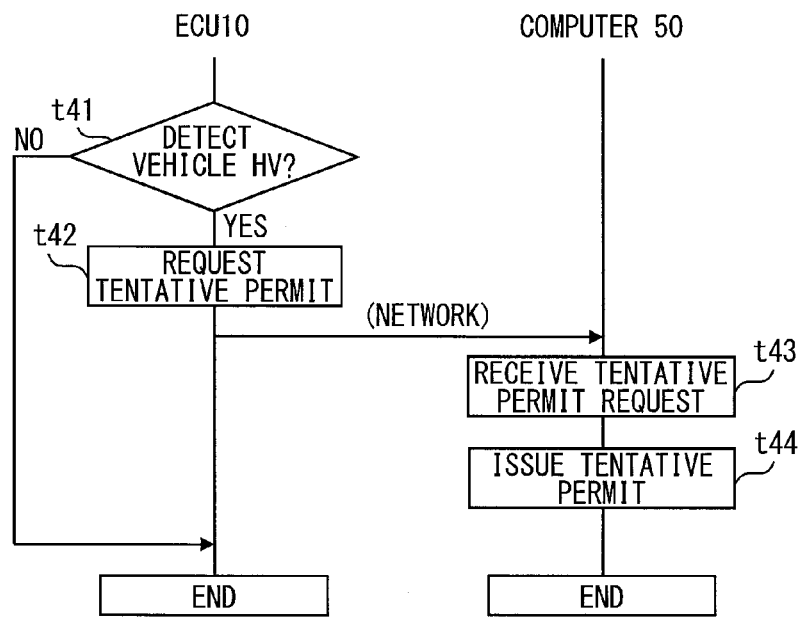
FIG. 7 is a diagram illustrating an example of a contact facility list according to the first embodiment.
FIG. 8 is a sequence diagram illustrating an example of a flowchart of a process after tire replacement according to a first modification.

In the present embodiment, as in FIG. 7, the contact facility list is premised on that each management computer 50 is associated with the name of the facility having each management computer 50, the contact, whether to be a high frequent use, and a tire position used for determination of a use permission. The contact may be an address of the management computer 50, for instance. In addition, whether to be high frequent use may be indicated as a high frequent use if the facility is used for five days or more a week. Alternatively, a high frequent use may be indicated if the facility is used every day.

In FIG. 7, the facilities B and D are indicated as a high frequent use. In addition, the facility A uses all the tire positions for determining a use permission, while the facility B uses the right-front wheel and the left-front wheel for determining a use permission. In addition, the facility C, the facility D, and facility E use the right-front wheel, the right-rear wheel, the left-front wheel, respectively, for determining a use permission.

In the present embodiment, the contact list includes the contacts of the management computers 50 of a plurality of facilities, but there is no need to be limited thereto. For example, the contact list may include the contact of the management computer 50 of only one facility.

At t24, the communication network reception section 507 of the management computer 50 receives a contact request that is transmitted via the communication network and LAN. At t25, in responding to the contract request, the communication network transmission section 508 of the management computer 50 transmits the contact information to the external communication apparatus 30 of the vehicle HV via the LAN and the communication network. The management computer 50 may store the contact information in a memory. The contact information stored in the memory of the management computer 50 may be updated one by one as needed by an administrator, for example.

At t26, the facility information reception section 107 of the ECU 10 for TPMS receives the contact information transmitted via the communication network from the management computer 50 via the external communication apparatus 30. At t27, the facility information update section 108 of the ECU 10 for TPMS updates the contact facility list stored in the contact storage portion 109 using the received contact information. This enables the contact facility list to be updated before the start of the contact extraction process that will be explained later. The contact extraction process can thus be started using the contact list on which the change, if present, of the contact information of the management computer 50 is reflected.

At t28, the contact extraction section 110 of the ECU 10 for TPMS performs the contact extraction process. The contact extraction process extracts the contact of the management computer 50 based on the contact facility list stored in the contact storage portion 109. For example, the contact of the management computer 50, which the tire ID of the tire replacement (hereinafter, post-replacement tire ID) is reported to, is extracted from (i) the tire position whose tire replacement is detected and (ii) the contact facility list. The following will explain a concrete example in the case of using the contact list in FIG. 7.

When the tire replacement is detected on all the tire positions, the contact extraction section 110 extracts the contacts of the management computers 50 of all the facilities A to E. When the tire replacement is detected on only the right-rear wheel, the contact extraction section 110 extracts the contact of the management computer 50 of the facility D. Here, the facility A containing the right rear wheel as the use tire position is not extracted. This is because the management computer 50 of the facility A can provide a use permission by using the tire IDs of any other tire positions different from the right-rear wheel.

Thus, the contact extraction section 110 extracts the contact of a subject management computer 50 from among all management computers 50 using a subject tire position at which the tire replacement is detected for determining a use permission, the subject management computer 50 not using any other tire position different from the subject tire position for determining a use permission.

Although the present embodiment indicates the configuration where the contact extraction section 110 extracts the contact of the subject management computer 50 not using any other tire positions different from the subject tire position at which the tire replacement is detected for determining a use permission, there is no need to be limited thereto. For example, the contact extraction section 110 may extract all the contacts of all the management computers 50 included in the contact facility list.

At t29, the post-replacement ID reporting section 111 of the ECU 10 for TPMS transmits a post-replacement tire ID to the management computer 50 of each contact extracted by the contact extraction section 110, via the external communication apparatus 30. The post-replacement ID reporting section 111 may transmit post-replacement tire IDs of all the tire positions. In the present embodiment, the following will explain an example that transmits (i) a post-replacement tire ID of a tire position where a tire replacement is detected, and (ii) this tire position.

At t30, the communication network reception section 507 of the management computer 50 receives the post-replacement tire ID and the tire position that are transmitted via the communication network and LAN. At t31, the registration change section 509 of the management computer 50 registers the post-replacement tire ID, which is received by the communication network reception section 507, in the registration portion 505; the process then ends.

For instance, the registration change section 509 updates the registration of the tire ID of the tire position of the vehicle HV received by the communication network reception section 507 in the registration list registered in the registration portion 505 by using the post-replacement tire ID received by the communication network reception section 507.

The present embodiment indicates the configuration that updates the registration of only the tire ID of the tire position where a tire replacement is detected. There is no need to be limited thereto. For example, when the registration ID list associates a tire ID with each vehicle, any tire position needs not be specified.

According to the configuration of the present embodiment, when a tire of the vehicle HV is replaced, the post-replacement tire ID of the tire that is substituted in the tire replacement is automatically registered in the management computer 50, saving the time and effort in registration of the post-replacement tire ID for users. In addition, the post-replacement tire ID is automatically registered in the management computer 50, preventing the failure of the registration. This can further save the time and effort for users in registering the post-replacement tire ID, eliminating an occurrence of the congestion of the vehicles waiting for their turns for use permissions.

Furthermore, the post-replacement tire ID is transmitted to the management computer 50 via the communication network from the ECU 10 for TPMS, involving no interference due to the direct wireless communication. This can prevent the management computer 50 from mistakenly registering the tire IDs of a vehicle that has not undergone a tire replacement, as post-replacement tire IDs. Thus, when the use permission of a facility is provided using the TPMS 40, an occurrence of congestion due to new registration of tire IDs can be suppressed and the times and efforts for users can be saved, allowing the management computer 50 to register correct tire IDs certainly.

[Modification]

The first embodiment is explained using the example acquiring a tire ID from a sensor unit 20 of a tire that is substituted in the tire replacement. There is no need to be limited thereto. For example, when any tire ID is not acquired from a sensor unit 20 of a tire substituted in the tire replacement, the process after the tire replacement may be provided as a first modification as follows.

With reference to the sequence diagram in FIG. 8, the following will explain a flowchart of a process after the tire replacement in the first modification. The first modification performs similarly the processing of t21 to t28 in the sequence diagram in FIG. 6. FIG. 8 indicates the processing after the processing of t21 to t28.

First, at t41, the use frequency determination section 112 of the ECU 10 for TPMS determines whether the use degree about the facility having the management computer 50 that uses the tire position where the tire replacement is detected for determining a use permission is equal to or greater than a predetermined degree, based on the contact facility list stored in the contact storage portion 109. For example, it may be determined whether the use degree of the facility having the management computer 50 of the contact (hereinafter, extracted contact) that is extracted in the contact extraction process at t28 is equal to or greater than a predetermined degree.

For instance, when the facility having the management computer 50 of the extracted contact corresponds to a high frequent use in the contact facility list, it is determined that the use degree is equal to or greater than a predetermined degree. In the example of the contact facility list in FIG. 7, when the facility having the management computer 50 of the extracted contact is the facility B or facility D, it is determined that the use degree is equal to or greater than a predetermined degree. When the use degree is determined to be equal to or greater than a predetermined degree (t41: YES), the processing moves to t42. In contrast, when the use degree is determined to be not equal to or greater than a predetermined degree (t41: NO), the process ends.

At t42, the tentative permission request section 113 of the ECU 10 for TPMS transmits a tentative permission request that requests a tentative permission allowing a temporary use permission of a facility, to the management computer 50 of the extracted contact that is determined by the use frequency determination section 112 to be equal to or greater than a predetermined degree in the use degree via the external communication apparatus 30.

At t43, the communication network reception section 507 of the management computer 50 receives the tentative permission request that is transmitted via the communication network and LAN. At t44, in responding to the tentative permission request, the tentative permission issuance section 510 of the management computer 50 issues a tentative permission and transmits the issued tentative permission to a portable terminal of a user of the vehicle HV such as a mobile phone, via the LAN and the communication network. The tentative permission received by the portable terminal may be displayed on a display of the portable terminal and presented to an administrator of the facility, providing a use permission of the facility.

Under the configuration of the first modification, even if the tire of the tire position used for determining a use permission of the facility is replaced with a tire having no tire ID, a temporary use permission of the facility can be provided by issuing a tentative permission when the use degree of the facility corresponds to a high frequency.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A facility-use management system comprising:
a tire pressure monitoring system of a vehicle having an in-vehicle control apparatus including a first CPU and a first memory storing a first executable program, the in-vehicle control apparatus being configured to
receive a first tire ID from a sensor unit provided in at least one tire of the vehicle, the first tire ID identifying the tire; and
an in-facility apparatus in a facility, including a second CPU and a second memory storing a second executable program and
a registration portion in which a second tire ID is registered, the second tire ID corresponding to a permitted vehicle that is provided with a use permission of the facility,
the in-facility apparatus being configured to receive the first tire ID wirelessly transmitted directly from the sensor unit, and
determine a use permission of the facility depending on whether the first tire ID received by the in-facility apparatus is included in the second tire ID registered in the registration portion,
the in-vehicle control apparatus including
a contact storage configured to store previously a contact of an in-facility apparatus of at least one facility that the vehicle uses,
the in-vehicle control apparatus being configured to
detect a tire replacement that is made in the vehicle, and
transmit a post-replacement tire ID of a tire that is substituted in the tire replacement to the contact stored in the contact storage via a communication network in response to the in-vehicle control apparatus detecting the tire replacement made in the vehicle, and
the in-facility apparatus being further configured to
automatically register the post-replacement tire ID in the registration portion in response to the post-replacement tire ID being transmitted from the in-vehicle control apparatus via the communication network,
wherein:
the contact storage stores
respective contacts of in-facility apparatuses of a plurality of facilities that the vehicle uses, and
a determination target tire position that is used for determining a use permission in each of the plurality of in-facility apparatuses,
the in-vehicle control apparatus is configured to extract the contact of the in-facility apparatus based on information stored in the contact storage and transmit the post-replacement tire ID to the contact extracted by the in-vehicle control apparatus via a communication network,
the in-vehicle control apparatus extracts the contact of the in-facility apparatus having the determination target tire position that
includes a replacement target tire position of the tire that is substituted in the tire replacement detected by the in-vehicle control apparatus, and, simultaneously,
does not include any other tire position different from the replacement target tire position,
based on the information stored in the contact storage,
the contact storage stores respective contacts of in-facility apparatuses of a plurality of facilities that the vehicle uses while simultaneously storing a determination target tire position and a use degree of the vehicle with respect to each of the plurality of in-facility apparatuses;

the in-vehicle control apparatus is further configured to
perform a determination based on information stored in the contact storage when the in-vehicle control apparatus detects the tire replacement, and, simultaneously, fails to receive the post-replacement tire ID from the sensor unit of the tire substituted in the tire replacement that is detected, the determination being as to whether the use degree of the in-facility apparatus having the determination target tire position that includes a replacement target tire position of the tire substituted in the tire replacement detected by the in-vehicle control apparatus is equal to or greater than a predetermined degree, and request a tentative permission that temporarily provides a use permission of the facility when the in-vehicle control apparatus determines that the use degree is equal to or greater than a predetermined degree, and the contact of the in-facility apparatus stored in the contact storage includes an address of the in-facility apparatus.

2. The facility-use management system according to claim 1, wherein the in-vehicle control apparatus is further configured to transmit the post-replacement tire ID to the contact stored in the contact storage via the communication network when the in-vehicle control apparatus detects the tire replacement made, and, simultaneously, the in-vehicle control apparatus receives the post-replacement tire ID from the sensor unit of the tire substituted in the tire replacement that is detected.

3. The facility-use management system according to claim 1, wherein:

the second tire ID is registered in the registration portion to be associated with each vehicle that is provided with a use permission; and when registering the post-replacement tire ID in the registration portion, the in-facility apparatus registers the post-replacement tire ID by replacing a tire ID that is previously registered as the second tire ID corresponding to the vehicle serving as a transmission source that transmits the post-replacement tire ID.

4. The facility-use management system according to claim 1, wherein information stored in the contact storage is updated using new information received one by one from the in-facility apparatus via the communication network.

5. An in-vehicle control apparatus used in the facility-use management system according to claim 1.

6. An in-facility apparatus used in the facility-use management system according to claim 1.

* * * * *